(12) United States Patent
Quinn et al.

(10) Patent No.: US 7,997,463 B2
(45) Date of Patent: Aug. 16, 2011

(54) NOZZLE, ADHESIVE DISPENSER, AND METHOD OF DISPENSING ADHESIVE

(75) Inventors: Gerald W. Quinn, North St. Paul, MN (US); Gerald P. Schouten, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 724 days.

(21) Appl. No.: 11/927,902

(22) Filed: Oct. 30, 2007

(65) Prior Publication Data

US 2009/0108033 A1    Apr. 30, 2009

(51) Int. Cl.
   B65D 5/72    (2006.01)
(52) U.S. Cl. ......... 222/571; 222/1; 222/146.5; 222/326; 222/490; 222/494; 137/844; 137/859
(58) Field of Classification Search ........... 222/1, 146.2, 222/146.5, 326–327, 490–491, 494, 571, 222/146.1, 544, 547, 553, 562–563, 568–570, 222/573; 137/842–846, 852, 859
See application file for complete search history.

(56) References Cited

U.S. PATENT DOCUMENTS

| | | | | |
|---|---|---|---|---|
| 3,430,816 A | * | 3/1969 | Nadherny et al. | 222/146.5 |
| 3,459,335 A | * | 8/1969 | Cohen et al. | 222/146.2 |
| 3,831,629 A | * | 8/1974 | Mackal et al. | 137/843 |
| 4,031,915 A | * | 6/1977 | McElhoe et al. | 137/529 |
| 4,493,972 A | * | 1/1985 | Steinel et al. | 219/230 |
| 4,951,846 A | | 8/1990 | Oster et al. | |
| 5,105,985 A | * | 4/1992 | Kroeber | 222/107 |
| 5,105,987 A | | 4/1992 | Quinn et al. | |
| 5,890,620 A | | 4/1999 | Belcastro | |
| 6,149,036 A | * | 11/2000 | Serio | 222/321.9 |
| 6,172,694 B1 | * | 1/2001 | Droege et al. | 347/85 |
| 6,378,742 B1 | * | 4/2002 | Rohr et al. | 222/494 |
| 6,460,736 B1 | * | 10/2002 | D'Agostino | 222/146.5 |
| 6,619,517 B2 | * | 9/2003 | Vakiener et al. | 222/525 |
| 6,722,536 B2 | | 4/2004 | Bremner et al. | |
| 6,986,472 B2 | | 1/2006 | Gordon | |

FOREIGN PATENT DOCUMENTS

DE    298 29 208 U1    2/1999
EP    0 443 262 A2    8/1991

OTHER PUBLICATIONS

"3M Scotch-Weld Polyurethane Reactive PUR EZ Adhesive Systems", product brochure, 2005, 6 pages, 3M Company, Saint Paul, MN, USA.

* cited by examiner

*Primary Examiner* — Kevin P Shaver
*Assistant Examiner* — Andrew Bainbridge
(74) *Attorney, Agent, or Firm* — Bradford B. Wright

(57) ABSTRACT

A nozzle, which is for in at least one embodiment a hot glue gun, has a resilient cap that is positioned within the nozzle's conduit. The resilient cap has at least one slit that serves as a check valve. The invention solves the problem of resilient caps in hot glue guns becoming unseated and wedging in the tapering section of the glue gun nozzle conduit by adding a collar inside the conduit that prevents the base section of the resilient cap from wedging in deeper into the nozzle's conduit, which would otherwise make the valve fail.

12 Claims, 3 Drawing Sheets

NOZZLE, ADHESIVE DISPENSER, AND METHOD OF DISPENSING ADHESIVE

BACKGROUND

Flowable adhesives are typically supplied in a container (e.g., a tube) fitted with a nozzle. In use, adhesive flows from the container through the nozzle and is applied to an intended substrate. In the case of reactive adhesives, the adhesive has a tendency to cure in the nozzle causing it to clog. Moreover, in the case of flowable adhesives, there is often a tendency of the adhesive to drip or ooze (e.g., depending on its viscosity) from the nozzle between applications.

To overcome the problem of dripping or oozing, valves have been placed within the nozzle. Many valves in commercial use have multiple machined or cast metallic parts and are costly. Valves of this type can easily become inoperative due to the properties of the adhesive used. Due to their cost, much effort is put into keeping these valves (and hence nozzles) operational, especially when using curing/drying adhesives.

One known approach to overcoming the foregoing problems is embodied in the prior art nozzle useful for dispensing some flowable adhesives shown in FIGS. 1A and 1B. Referring now to FIGS. 1A and 1B, prior art nozzle 100 has a hollow body 105 made of polypropylene. An internal wall surface 110 defines a tubular conduit 120, which extends from an inlet port 145 to a dispensing port 140. Internal wall surface 110 has a cylindrical portion 112 adjacent a frustoconical portion 118. A vinyl resilient cap 150 snugly contacts frustoconical portion 118 of internal wall surface 110. The vinyl resilient cap 150 has an annular sidewall 160 extending from a circular base 170 that has a slit 180 therein. Prior art nozzle 100 also has screw threads 132 formed in the internal wall surface 110 adjacent inlet port 145, flange 134 proximate inlet port 145, and reinforcing ribs 107 formed on an exterior surface of the nozzle 100.

SUMMARY

In one aspect, the present disclosure relates to a nozzle comprising: a hollow body comprising an internal wall surface defining a conduit, the conduit extending from an inlet port to a dispensing port, and at least a portion of the internal wall surface having consecutively: a substantially cylindrical barrel, a substantially frustoconical cap seat, a collar, and a dispensing tube; a resilient cap snugly contacting the substantially frustoconical cap seat, the resilient cap comprising an annular sidewall extending from a circular base, the circular base having at least one slit therein, wherein the resilient cap is oriented with the circular base toward the collar. In certain embodiments, the nozzle is thermally stable at a temperature of at least 240 degrees Fahrenheit (i.e., ° F.). In certain embodiments, the nozzle is thermally stable at a temperature of 300° F.

In certain embodiments, the resilient cap comprises an elastomer. In certain embodiments, the resilient cap comprises vinyl. In certain embodiments, the resilient cap has a central nib and at least one slit is disposed at least partially within the central nib. In certain embodiments, at least one slit comprises a cut.

In certain embodiments, the hollow body further comprises an exterior surface comprising reinforcing ribs. In certain embodiments, the hollow body comprises a polymeric material (e.g., a polyacetal). In certain embodiments, the hollow body further comprises: a flange proximate the inlet port; and screw threads formed in the internal wall surface adjacent the inlet port.

Nozzles according to the present disclosure are useful, for example, for dispensing flowable adhesives, and especially viscous flowable adhesives that are heated (e.g., to a temperature of at least 240° F.) in order to dispense them.

We discovered that prior art nozzle 100 shown in FIGS. 1A and 1B frequently plugs if used with viscous adhesives at 240° F. Without wishing to be bound by theory, we believe that the vinyl resilient cap 150 softens and deforms resulting in it progressing down the conduit to a point where compression from the inner wall surface closes the slit. In contrast, nozzles according to the present disclosure typically do not exhibit this problem. Moreover, if used for dispensing viscous flowable adhesives, nozzles according to the present disclosure typically don't drip or ooze, and can in many instances be manufactured inexpensively enough to be disposable.

Accordingly, in another aspect, the present disclosure relates to an adhesive dispenser comprising: a container enclosing a reducible cavity containing a flowable adhesive, the reducible cavity fluidly connected to the inlet port of a nozzle according to the present disclosure.

In certain embodiments, the container further comprises a threaded outlet port, wherein the hollow body of the nozzle further comprises: a flange proximate the inlet port; and screw threads formed in the internal wall surface adjacent the inlet port, wherein the threaded outlet port threadably engages the screw threads formed in the internal wall surface. In certain embodiments, the flowable adhesive comprises a viscous reactive adhesive. In certain embodiments, the flowable adhesive comprises a polyurethane reactive adhesive.

In yet another aspect, the present disclosure relates to a method of dispensing an adhesive, the method comprising dispensing the flowable adhesive from an adhesive dispenser according to the present disclosure. In certain embodiments, at least a portion of the flowable adhesive is heated to a temperature in a range of from 240 to 300° F.

As used herein:

the term "downstream" refers to flow from the inlet port to the dispensing port;

the term "elastomer" refers to an elastic polymer;

the term "resilient" means returning to, or capable of returning to, an initial shape after mechanical deformation;

the term "slit" refers to a narrow cut or opening, which may be long or short, and which may be straight or curved;

the terms "snug contact" and "snugly contacting" mean that the two items in contact are frictionally held in place regardless of orientation of the nozzle.

the term "substantially cylindrical barrel" means that the barrel has a cylindrical appearance but allows for minor deviations in shape, for example, as resulting from tolerances in manufacturing;

the term "substantially frustoconical cap seat" means that the cap seat has a frustoconical appearance but allows for minor deviations in shape, for example, as resulting from tolerances in manufacturing;

the term "thermally stable" in reference to a given temperature means not deformed (e.g., by softening or melting) or otherwise decomposed by heating at that temperature; and the term "oriented toward" means oriented in a position facing.

Certain advantages of various nozzles according to the present disclosure are more fully shown and described in the drawings and detailed description below wherein like reference numerals are used to represent similar parts. It is to be understood, however, that the description and drawings are for the purposes of illustration only and should not be read in a manner that would unduly limit the scope of this invention.

DETAILED DESCRIPTION

Figure 1A:
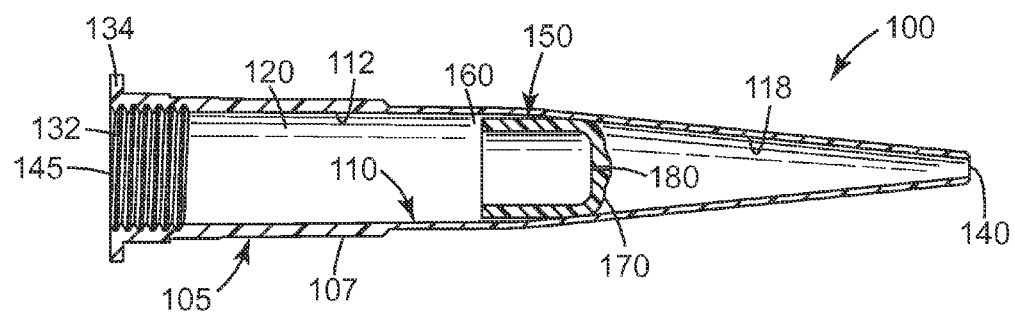
FIG. 1A is a cross-sectional side view of the prior art nozzle shown in FIG. 1B.
Figure 1B:
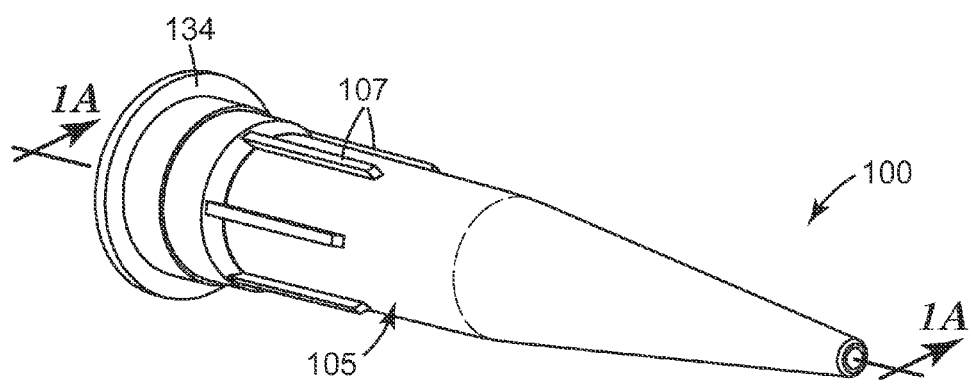
FIG. 1B is a perspective view of the prior art nozzle shown in FIG. 1A.
Figure 2A:
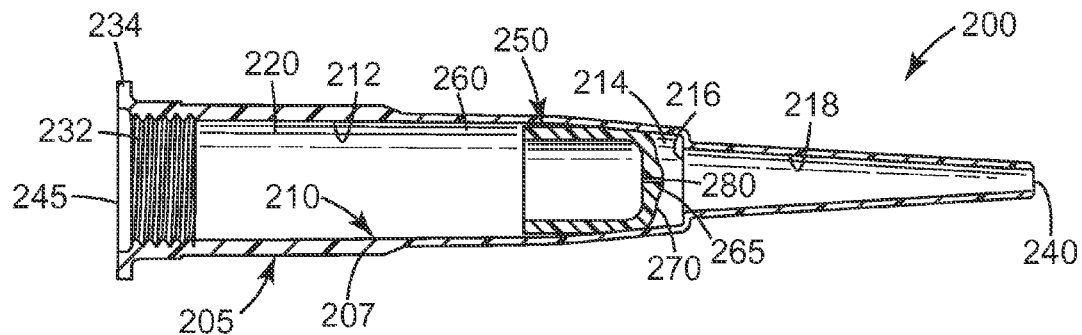
FIG. 2A is a cross-sectional side view of an exemplary nozzle according to one embodiment of the present disclosure, shown in FIG. 2B.

Referring now to FIG. 2A, exemplary nozzle 200 according to one embodiment of the present disclosure comprises hollow body 205 comprising an internal wall surface 210 defining a conduit 220. Conduit 220 is substantially tubular and extends from inlet port 245 to dispensing port 240. A portion of internal wall surface 210 has consecutively: a substantially cylindrical barrel 212 (hereinafter referred to as the "barrel"), a substantially frustoconical cap seat 214 (hereinafter referred to as the "cap seat"), collar 216, and a dispensing tube 218. Resilient cap 250 snugly contacts cap seat 214. Resilient cap 250 comprises annular sidewall 260 extending from a circular base 270 that has slit 280 therein. As shown, circular base has optional central nib 265. Resilient cap 250 is oriented with circular base 270 toward collar 216.

In some embodiments, nozzles according to the present disclosure are thermally stable at temperatures at or above 240° F. or even at or above 300° F., which allows them to be successfully used to dispense adhesives that have sufficiently high viscosity that they require heating to such temperatures in order to dispense them effectively.

The hollow body may be formed of any material that is thermally stable at temperatures of at least from 240° F. to 300° F., or higher. Suitable materials may be selected from, e.g., metal, glass, and polymeric materials such as thermoplastics and thermosets, as well as combinations thereof. Polymeric materials may be combined with one or more additives such as, for example, filler(s), toughener(s), plasticizer(s), flame retardant(s), antioxidant(s), colorant(s), processing aid(s), and/or mold release agent(s). In some embodiments, e.g., for disposable applications, the hollow body may comprise an injection molded polymeric material.

Examples of useful polymeric materials include: polyacetals such as those acetal resins available from E. I. du Pont de Nemours & Co. under the trade designation "DELRIN"; acrylonitrile butadiene styrene (ABS); polycarbonates (PC); polyamides (PA); high impact polystyrene (HIPS); polybutylene terephthalate (PBT); polyethylene terephthalate (PET); polyphenylene oxide (PPO); polysulphone (PSU); polyetherketone (PEK); polyetheretherketone (PEEK); and polyimides.

The barrel serves to convey adhesive from the inlet port into the remainder of the conduit. The barrel may have any length and/or diameter. In general, the barrel should have an inner diameter sufficient to permit passage of the resilient cap to the cap seat during fabrication.

The cap seat narrows the conduit relative to the barrel. Depending on the shape of the resilient cap the cap seat may have any taper angle, however, typically a taper angle of from 5 to 20 degrees is generally useful for achieving snug contact between the resilient cap and the cap seat. In general, higher taper angles (e.g., taper angles greater than about 60 degrees) may tend to make achieving such snug contact more difficult.

The collar serves to prevent the resilient cap from traveling sufficiently far into the dispensing tube to cause plugging during use under at least some conditions. Typically, the collar is formed at an abrupt angle relative to the cap seat. For example, the collar may comprise a disk oriented perpendicularly to a longitudinal rotational axis of the barrel. It is envisioned that other similar shapes may also be used. While the collar may have any dimensions (e.g., thickness and/or inner diameter) depending typically on the particular choice of resilient cap and conduit dimensions, any reduction in the diameter of the downstream end of the cap seat may be used. For example, the collar may reduce the diameter of the downstream end of the cap seat by at least 10, 20, 30, or even 40 percent, or more. However, excessive reduction in the diameter (e.g., to a point where the collar blocks a portion of the slit(s) in the resilient cap valve) will typically limit the flow capacity through the slit(s).

The dispensing tube may have any size or shape. For example, it may be conical in its entirety or for only a portion thereof. In some embodiments it may be straight and in other embodiments bent. The outlet port may have any desired shape (e.g., a circle, an ellipse, or a slot).

The nozzle may further comprise various optional features. Referring again to FIGS. 2A and 2B, exemplary optional features include: screw threads 232 formed in the internal wall surface adjacent the inlet port (e.g., to provide a secure fluid connection to an adhesive-filled container such as a cartridge); flange 234 proximate the inlet port (e.g., to provide strength to the inlet port and/or sealing); and reinforcing ribs 207 (see FIG. 2B) formed on an exterior surface of the nozzle opposite the barrel (e.g., to provide dimensional stability (e.g., against bending) and/or provide a gripping surface for screwing the nozzle onto an adhesive-filled container such as a cartridge.

The resilient cap is first of all resilient. It may comprise any resilient material that is impermeable to at least one adhesive, is capable of effecting a seal between the resilient cap and the cap seat, and enables the slit(s) in the resilient cap to regulate passage of adhesive into the dispensing tube during normal use. Examples of suitable materials include polymeric materials such as vinyl (e.g., plasticized polyvinyl chloride) and elastomers (e.g., natural rubbers, or synthetic rubbers such as silicones, styrene-butadiene rubbers, EPDM rubbers, or chloroprene rubbers). Polymeric materials having a Shore A hardness in a range of from 60 to 80 are typically useful for forming the resilient cap, although this is not a requirement. The resilient cap may be formed, for example, using molding techniques well known in the art or obtained form commercial sources.

The sidewall of the resilient cap typically has a substantially uniform thickness, although variation in uniformity of the wall thickness is permissible. The sidewall and circular base may have any thickness, typically depending on the composition of the resilient cap, as long as the resilient cap remains sufficiently flexible to form a seal with the cap seat and/or collar. For example, for use with a hollow body as shown in FIG. 2A having an overall conduit length 4.050 inches, the cap may have a height in a range of from 0.55 to 0.67 inches (e.g., 0.608 inches) and diameter in a range of from 0.461 to 0.475 inches (e.g., 0.468 inches), and the sidewall may have a thickness in a range of from 0.055 to 0.070 inches (e.g., 0.062 inches), the circular base may have a thickness in a range of from 0.085 to 0.100 inches (e.g., 0.093 inches).

The circular base may be essentially flat or domed (e.g., hemispherical), although other shapes are also permissible. Moreover, the circular base may optionally comprise a nib (e.g., shown as 265 in FIG. 2C). Such nibs may be, for example, hemispherical, conical, or some other shape.

Figure 2B:
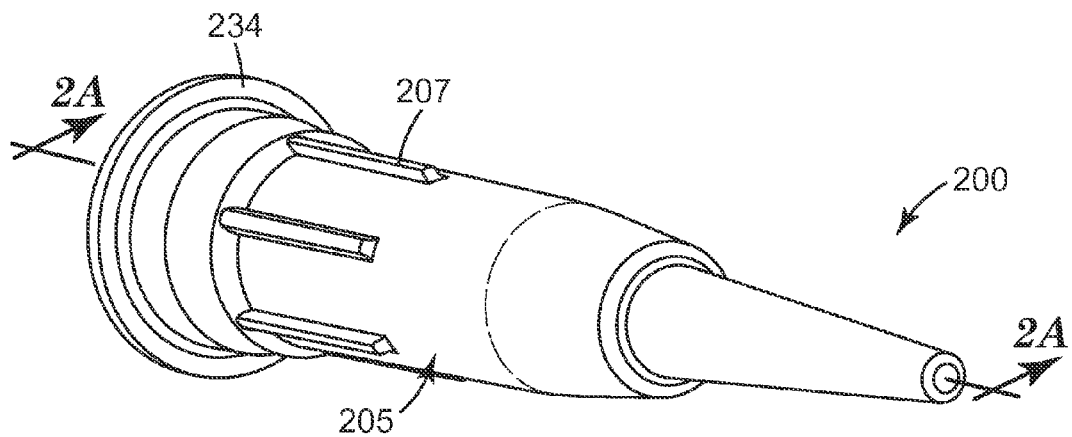
FIG. 2B is a perspective view of the exemplary nozzle shown in FIG. 2A.
Figure 2C:
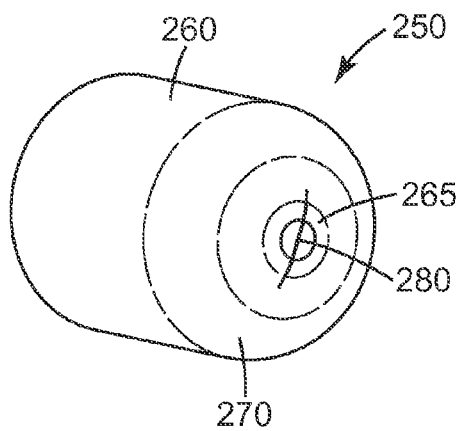
FIG. 2C is a perspective view of resilient cap 250.

In general, the resilient cap may have a wide variety of shapes (e.g., substantially cylindrical, substantially frustoconical, or as shown in FIGS. 2A-2C) as long as it is of sufficient dimensions to snugly contact the cap seat.

The slit(s) may have any shape (e.g., linear or arcuate) and any length(s). Multiple slits may be arranged in any manner (e.g., a cross or a star). The slit(s) in the resilient cap expand (e.g., forming an opening or enlarging an existing opening) during use as pressure is applied to flowable material dispensed through the nozzle. As the pressure applied to the flowable material decreases, the slit(s) tend to close (e.g., at least partially close). Accordingly, they regulate flow and will typically be sized depending on the intended use. The slit(s) may be closed, open, or partially open.

Figure 3:
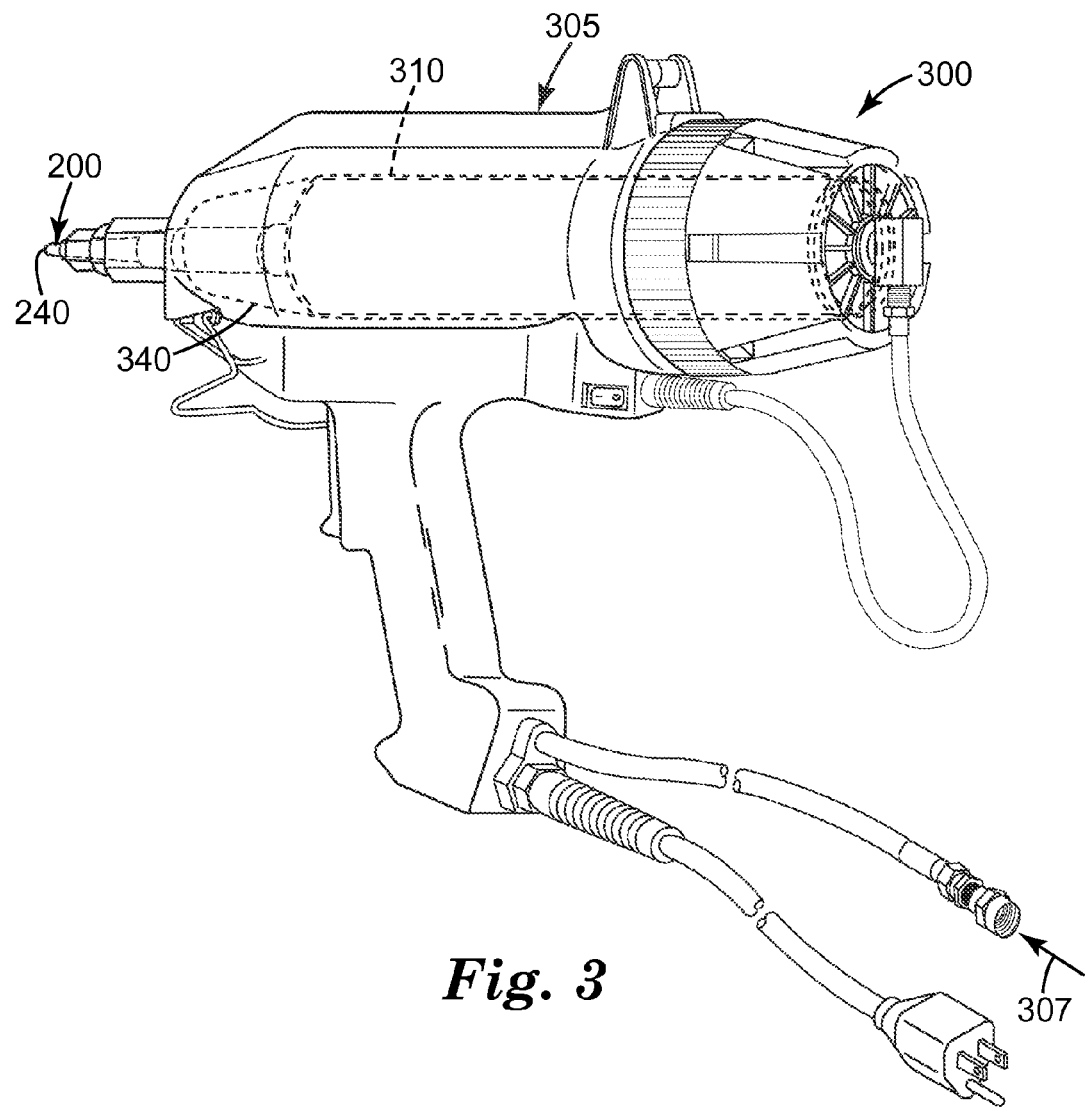
FIG. 3 is a perspective view of an adhesive dispenser according to some embodiments of the present disclosure.

In some embodiments, nozzles according to the present disclosure are useful in the manufacture of adhesive dispensers. An exemplary adhesive dispenser is shown in FIG. 3. Adhesive dispenser 300 has nozzle 200 threadably engaged to an adhesive container 310 (shown as a cartridge tube) enclosing a reducible cavity (not shown) filled with a flowable adhesive (e.g., a polyurethane reactive adhesive, not shown). The engaged nozzle/container assembly is disposed within adhesive applicator 305. Adhesive applicator 305 further includes an optional heat source 340 that may heat the flowable adhesive to achieve a desired viscosity. In use, compressed air 307 is used to shrink the volume of the reducible cavity thereby forcing the flowable adhesive into and through nozzle 200. Such adhesive dispensers are useful for, e.g., applying viscous adhesives, and especially those that must be heated in order to have appreciable flowability.

Nozzles according to the present disclosure may be used, for example, in combination with commercially available adhesive applicators such as, for example, "3M SCOTCH-WELD POLYURETHANE REACTIVE ADHESIVE APPLICATOR, 62-9895-9930-3 (250 DEG F, GREY)", "3M SCOTCH-WELD POLYURETHANE REACTIVE (PUR) EASY ADHESIVE APPLICATOR, 62-9845-9930-8 (170 DEG F, GREEN)", and "3M SCOTCH-WELD POLYURETHANE REACTIVE (PUR) EASY 250 ADHESIVE APPLICATOR, 62-9865-9930-6 (250 DEG F, YELLOW)".

Various modifications and alterations of this invention may be made by those skilled in the art without departing from the scope and spirit of this invention, and it should be understood that this invention is not to be unduly limited to the illustrative embodiments set forth herein.

What is claimed is:

1. A nozzle comprising:
    a hollow body comprising an internal wall surface defining a conduit, the conduit extending from an inlet port to a dispensing port, wherein at least a portion of the internal wall surface has consecutively: a substantially cylindrical barrel, a substantially frustoconical cap seat, a collar, and a dispensing tube;
    a resilient cap snugly contacting the substantially frustoconical cap seat, the resilient cap comprising an annular sidewall extending from a circular base, the circular base having at least one slit therein, wherein the resilient cap is oriented with the circular base toward the collar.

2. The nozzle of claim 1, wherein the nozzle is thermally stable at a temperature of at least 240° F.

3. The nozzle of claim 1, wherein the nozzle is thermally stable at a temperature of 300° F.

4. The nozzle of claim 1, wherein the resilient cap comprises an elastomer.

5. The nozzle of claim 1, wherein the resilient cap comprises vinyl.

6. The nozzle of claim 1, wherein the resilient cap has a central nib, and wherein the at least one slit is disposed at least partially within the central nib.

7. The nozzle of claim 1, wherein the hollow body comprises a polymeric material.

8. The nozzle of claim 7, wherein the polymeric material comprises a polyacetal.

9. The nozzle of claim 1, wherein the hollow body further comprises an exterior surface comprising reinforcing ribs.

10. The nozzle of claim 1, wherein the hollow body further comprises: a flange proximate the inlet port, and screw threads formed in the internal wall surface adjacent the inlet port.

11. An adhesive dispenser comprising:
    a nozzle comprising:
        a hollow body comprising an internal wall surface defining a conduit, the conduit extending from an inlet port to a dispensing port, wherein at least a portion of the internal wall surface has consecutively: a substantially cylindrical barrel, a substantially frustoconical cap seat, a collar, and a dispensing tube;
        a resilient cap snugly contacting the substantially frustoconical cap seat, the resilient cap comprising an annular sidewall extending from a circular base, the circular base having at least one slit therein, wherein the resilient cap is oriented with the circular base toward the collar; and
    a container enclosing a reducible cavity containing a flowable adhesive, the reducible cavity fluidly connected to the inlet port of the nozzle.

12. A method of dispensing an adhesive, the method comprising:
    providing an adhesive dispenser comprising:
        a nozzle comprising:
            a hollow body comprising an internal wall surface defining a conduit, the conduit extending from an inlet port to a dispensing port, wherein at least a portion of the internal wall surface has consecutively: a substantially cylindrical barrel, a substantially frustoconical cap seat, a collar, and a dispensing tube;
            a resilient cap snugly contacting the substantially frustoconical cap seat, the resilient cap comprising an annular sidewall extending from a circular base, the circular base having at least one slit therein, wherein the resilient cap is oriented with the circular base toward the collar; and
        a container enclosing a reducible cavity containing a flowable adhesive, the reducible cavity fluidly connected to the inlet port of the nozzle; and
    dispensing the flowable adhesive from the adhesive dispenser.

* * * * *